(12) United States Patent
Wiepen

(10) Patent No.: US 7,157,181 B2
(45) Date of Patent: Jan. 2, 2007

(54) ELECTROCHEMICAL ELEMENT HAVING A WOUND ELECTRODE SET

(75) Inventor: Rolf Wiepen, Schwerte (DE)

(73) Assignee: NBT GmbH, Hannover (DE)

(*) Notice: Subject to any disclaimer, the term of this patent is extended or adjusted under 35 U.S.C. 154(b) by 444 days.

(21) Appl. No.: 10/308,506

(22) Filed: Dec. 3, 2002

(65) Prior Publication Data

US 2003/0104274 A1 Jun. 5, 2003

(30) Foreign Application Priority Data

Dec. 3, 2001 (DE) ............................. 101 59 231

(51) Int. Cl.
H01M 2/26 (2006.01)
H01M 6/10 (2006.01)

(52) U.S. Cl. ........................ 429/161; 429/94

(58) Field of Classification Search ................ 429/94, 429/66, 130, 161
See application file for complete search history.

(56) References Cited

U.S. PATENT DOCUMENTS

| | | | |
|---|---|---|---|
| 2,536,699 A | 1/1951 | Ruben ..................... 136/107 |
| 3,837,925 A | 9/1974 | Cailley et al. | |
| 4,025,696 A | 5/1977 | Tucholski et al. .......... 426/61 |
| 4,049,883 A * | 9/1977 | Schenk et al. ............. 429/94 |
| 4,529,675 A * | 7/1985 | Sugalski ................... 429/94 |
| 5,043,235 A * | 8/1991 | Seefeldt et al. ........... 429/94 |
| 5,588,970 A | 12/1996 | Hughett et al. ........... 29/623.2 |

FOREIGN PATENT DOCUMENTS

| | | |
|---|---|---|
| DE | 30 19 186 A1 | 11/1981 |
| DE | 30 14 435 C2 | 3/1984 |
| DE | 39 02 648 A1 | 8/1990 |
| EP | 0 145 931 B1 | 6/1985 |
| EP | 0 415 011 | 3/1991 |
| EP | 0 415 011 A2 | 3/1991 |
| EP | 0 415 011 B1 | 3/1991 |
| EP | 1 134 819 A2 | 9/2001 |
| JP | 2001/256954 A | 9/2001 |
| JP | 2001256954 | 9/2001 |

OTHER PUBLICATIONS

International Search Report for FR 0215120, date of mailing Jan. 5, 2006, 2 pages.

* cited by examiner

Primary Examiner—Patrick Joseph Ryan
Assistant Examiner—Thomas H. Parsons
(74) Attorney, Agent, or Firm—Foley & Lardner LLP

(57) ABSTRACT

An electrochemical element having a winding electrode set comprises a strip positive electrode, a strip negative electrode and a strip separator which is located between them, which are wound up in a spiral to form an electrode winding. The electrochemical element has a cylindrical housing for holding the electrode winding, and a sealed cell pole which is isolated from the housing. The physical distance between the edge of at least one winding electrode and one pole is bridged by a current collector with spring elements. The current collector provides the connection between the electrode and one pole. The spring elements can be conductively connected to collector disks, to the cover and to the bottom of a cup of the electrochemical element.

10 Claims, 3 Drawing Sheets

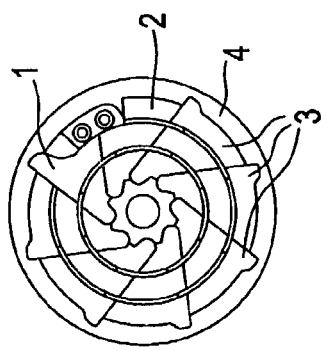
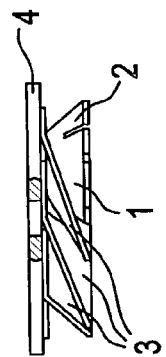
FIG. 3A
FIG. 3B
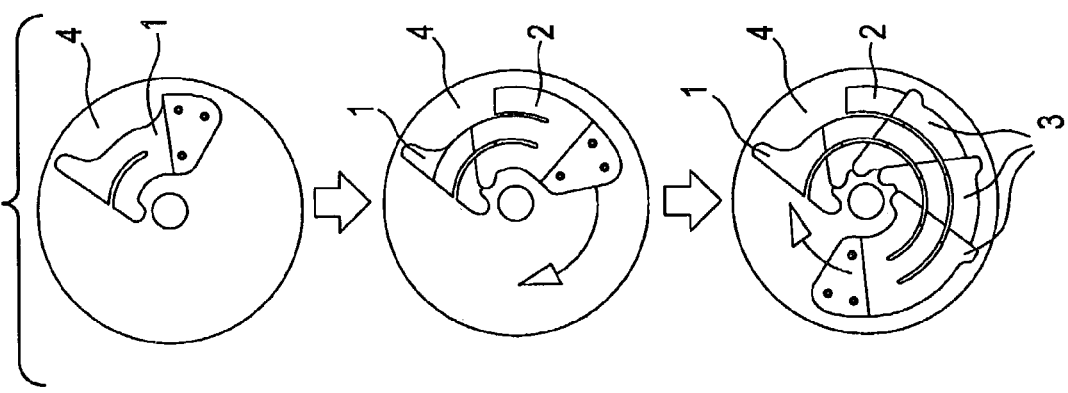
FIG. 2
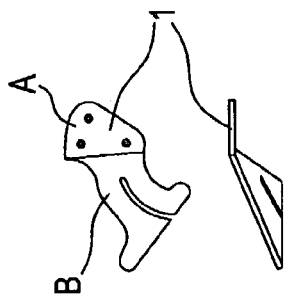
FIG. 1A
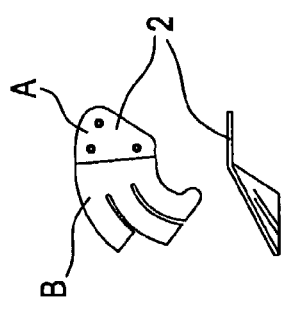
FIG. 1B
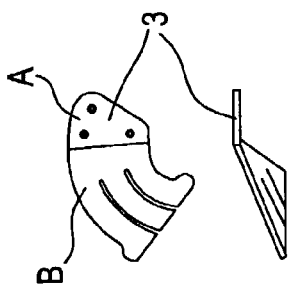
FIG. 1C

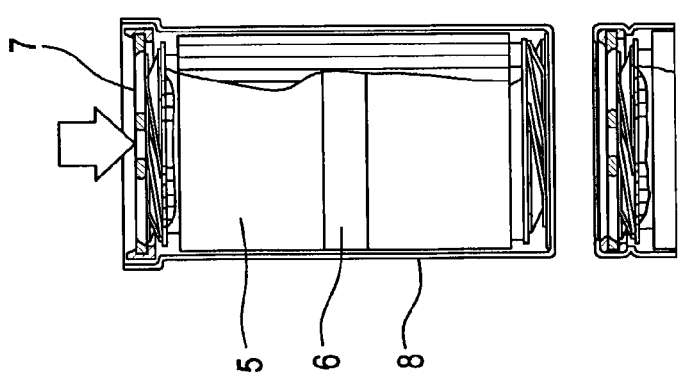
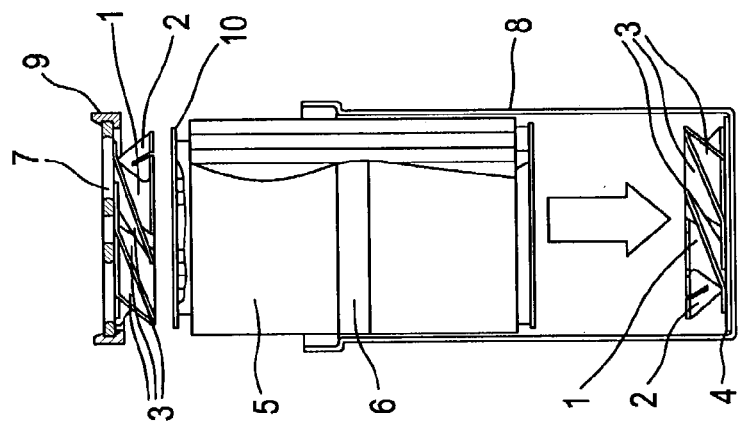
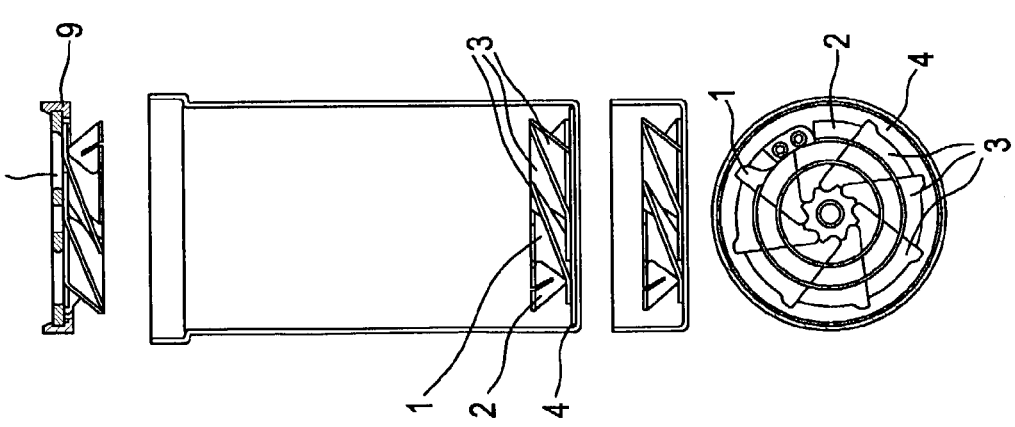

ELECTROCHEMICAL ELEMENT HAVING A WOUND ELECTRODE SET

RELATED APPLICATION

This application claims priority of German Patent Application No. 101 59 231.0, filed Dec. 3, 2001.

FIELD OF THE INVENTION

The invention relates to an electrochemical element having a wound electrode set, more particularly lithium, nickel metal hydride, nickel cadmium and other electrochemical elements in the form of round cells with a wound electrode set.

BACKGROUND

In DE 30 14 435 C2, a spiral electrode comprising a positive and a negative electrode plate and a separator layer is wound between the electrode plates onto a winding core which is electrically connected to an electrode plate as a collector bar. The physical distance between the end of the collector bar and the cover is spanned by an electrically conductive spring part formed from a helical spring.

DE 39 02 648 A1 discloses an electrochemical element which is in the form of a wound cell and in which the current collector is a slotted metal needle into which one electrode is clamped with its supporting frame, with a leaf spring which is firmly welded to the cover producing the contact with the current collector. Since the edge of a hole which is stamped in the leaf spring rests on the thicker head end, which is in the form of an eye, of the current collector, this results in a high contact pressure force.

In EP 0 415 011 B1, the physical distance between the cell pole and the edge of one electrode strip is bridged by a connecting element, which is a combination of a contact disk with a contact bracket which is centrally welded and are in the form of forks, and a compression spring which is fitted to the contact disk with the interposition of an isolating disk with a central hole, and with the force of the stress compression spring being used to press the contact disk against that edge of the first electrode strip which projects on the end face of the winding. The end pole is inserted into the contact bracket, which is in the form of a fork.

The configuration of the current collector for wound electrodes with spring elements and with an output contact as disclosed in the prior art, represents a bottleneck for electrical conduction, which can be overcome only to a limited extent by the choice of materials and dimensions.

It would accordingly be advantageous to provide an electrochemical element having a wound electrode set, in which metallic spring elements which are easy to install, are cost-effective and nevertheless can be loaded with high currents to ensure reliable contact between the winding electrodes and the poles of the electrochemical element.

SUMMARY OF THE INVENTION

This invention relates to an electrochemical element having a wound electrode set, including a strip positive electrode, a strip negative electrode, a strip separator located between the positive and negative electrodes to form a wound up, spiral electrode winding, a cylindrical housing which holds the electrode winding, a sealed cell pole isolated from the housing, and a sprung connecting element which conductively bridges a distance between an edge of at least one electrode strip and the cell pole, the connecting element including a plurality of spring elements composed of electrically conductive steel strip material connected to the cell pole.

BRIEF DESCRIPTION OF THE DRAWINGS

The construction and method of operation will be explained in the following text with reference to the figures.

FIGS. 1A–1C show schematic perspective views of the spring elements for a connecting element.

FIG. 2 shows schematic views of steps of assembly of the prior assembly of the spring elements to form a current collector.

FIGS. 3A–3B show schematic top plan and side views, respectively, of a previously assembled current collector.

FIG. 4 shows schematic views, some taken in section, of the individual parts of an electrochemical element which is equipped with the connecting elements according to the invention in an exploded and separated form, for ease of understanding.

FIG. 5 shows schematic elevational views, some taken in section, of the steps for assembling the electrochemical element.

FIG. 6 shows schematic elevational views of the steps of closure of the electrochemical element.

DETAILED DESCRIPTION

Figure 7:
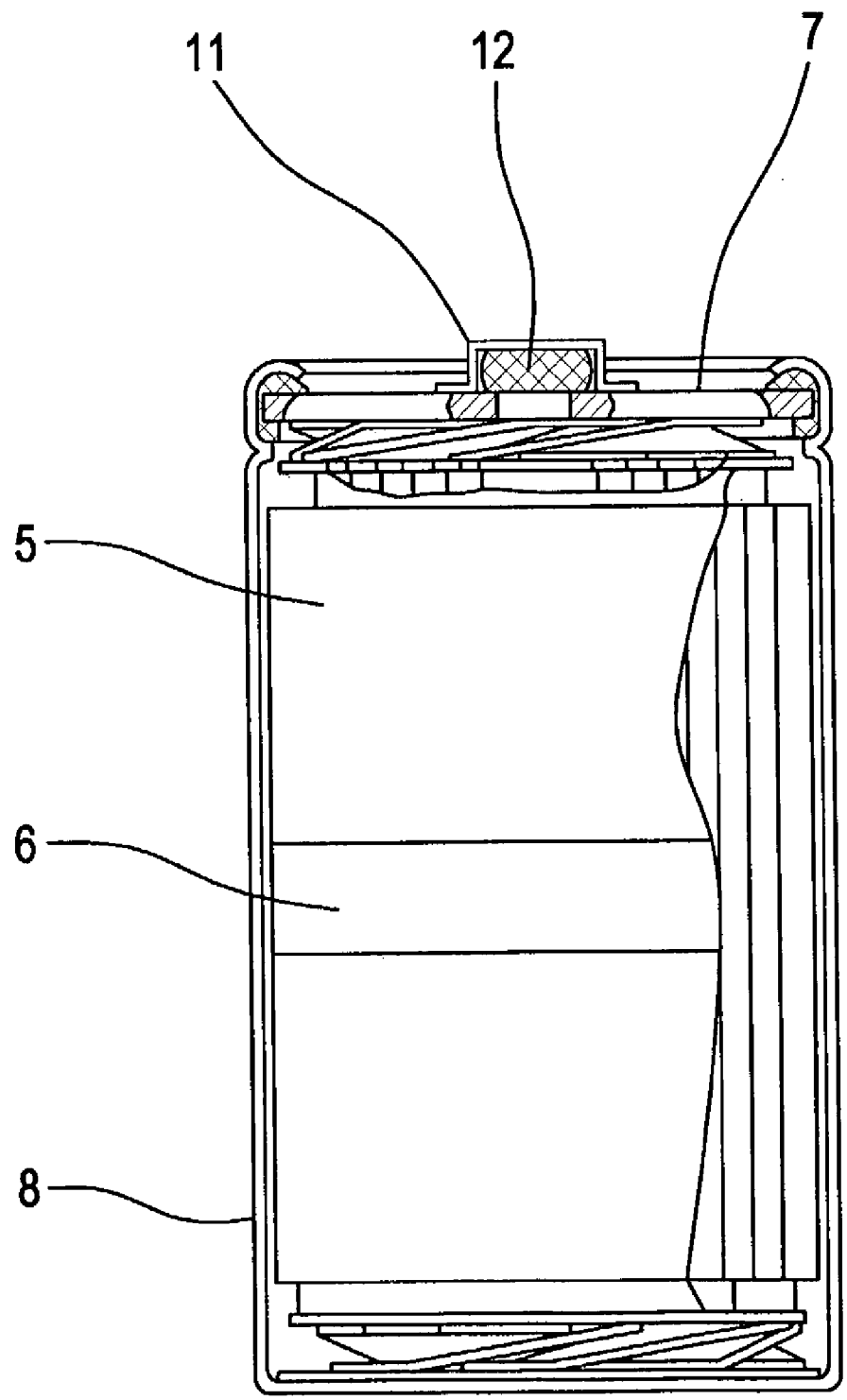
FIG. 7 shows a schematic elevational view of the electrochemical element, taken partly in section for ease of understanding.

It will be appreciated that the following description is intended to refer to specific embodiments of the invention selected for illustration in the drawings and is not intended to define or limit the invention, other than in the appended claims.

The electrochemical element according to the invention provides the least possible resistance to the electric current through the current collector according to the invention by having more than one spring contact. These current collectors are considerably simpler to install than known collector designs in electrochemical elements for high-current applications. The space-saving flat structure of the connecting elements results in a high utilization level of the capacity of the electrochemical element. The invention is applicable in a preferred manner to lithium, nickel metal hydride, nickel cadmium and other electrochemical elements in the form of round cells with wound electrodes.

A particular advantage of the invention is that, using the same components, it is possible to achieve a current collector system with a high power capacity, and with a low electrical resistance on the positive and negative electrodes of an electrode winding.

Turning now to the drawings, FIGS. 1A–C show three spring elements of different shape, as are used for producing a current collector according to the invention. The spring element 1, spring element 2 and spring element 3 comprise an attachment section A, which is used for connecting the spring elements to a pole contact disk (not shown) or to a cell pole (not shown), and an angled contact section B. The contact section B may advantageously have at least one slot in the form of a circular arc.

As shown in FIG. 2, the spring elements are welded successively to the bottom of the housing 8 (FIG. 5), to a cover 7 and to a pole contact disk 4 as a mount. It is advantageous to start this process with the spring element 1.

The spring element 2 is fitted offset by one segment pitch. The edge cutouts in the contact section B of the spring elements 1 and 2 result in a gap remaining in the edge contour of the current collector, which leaves space for the attachment of the last spring element 3. After this, the spring elements 3 are fitted to the mount, each offset by one further pitch.

FIG. 3 shows a plan view of the completed current collector, as well as a side view with unloaded spring elements 1, 2 and 3.

FIG. 4 shows the process of assembling the electrochemical element from its prefabricated components. FIG. 4 shows all the variants of the current collector with spring elements. One set of spring elements is attached directly to the cover 7, which is provided with a circumferential seal 9, another is alternatively mounted in advance on the pole contact disk 4, or is attached directly to the bottom of the cup 8.

As shown in FIG. 5, the rolled-up winding electrodes 5, secured by a binding 6 and with a separator located between them, are pushed into the cup 8. Edges of the wound electrodes 5 which project on the end surfaces can preferably be welded to a contact disk 10, as shown in FIG. 5.

FIG. 6 shows how the springs 1, 2, 3 of the current collectors are stressed by pushing in the cover 7. The current collectors and the wound electrodes 5 are fixed in their position by peening over the edge of the cup 8, thus closing the electrochemical element.

FIG. 7 shows a completed battery. Pole cap 11 connects to the electrically conducting cover 7. The pole cap 11 is positioned on the cover after the battery has been filed with electrolyte through the central opening of the cover. The opening is closed by a sealing means 12 which is pressed against the opening by means of the pole cap.

The invention claimed is:

1. An electrochemical element having a wound electrode set, comprising:
   a strip positive electrode;
   a strip negative electrode;
   a strip separator located between the positive and negative electrodes to form a wound up, spiral electrode winding;
   a cylindrical housing which holds the electrode winding;
   a sealed cell pole isolated from the housing;
   and a connecting element which conductively bridges a distance between an edge of at least one electrode strip and the cell pole, the connecting element comprising a plurality of individually formed spring elements composed of electrically conductive steel strip material connected to the cell pole by a weld;
   wherein each of the spring elements comprise an attachment section attached to the cell pole and a contact section which is bent away from the attachment section at an acute angle;
   wherein the contact section of at least one of the spring elements has a configuration that differs from that of a contact section of another of the spring elements, with a first two spring elements comprising edge cutouts in the contact section through which the attachment section of a third spring element is accessible.

2. The electro chemical element as claimed in claim 1, wherein ends of the contact sections lie on one circular radius.

3. The electrochemical element as claimed in claim 1, wherein ends of the contact sections are rounded.

4. The electrochemical element as claimed in claim 1, wherein the cell pole is substituted with a pole output disk.

5. The electrochemical element as claimed in claim 1, wherein the spring elements are not integrally formed with the electrode strip and the cell pole.

6. The electro chemical element as claimed in claim 1, wherein the spring elements are welded to the electrode strip and the cell pole.

7. The electro chemical element as claimed in claim 1, wherein the electrochemical element is produced by a method that comprises sequentially attaching each of the spring elements to the cell pole.

8. The electrochemical element as claimed in claim 7, wherein the first two spring elements are attached to the cell pole before the third spring element, the third spring element being the last spring element attached to the cell pole.

9. The electrochemical element as claimed in claim 8, further comprising at least one additional spring element provided between the third spring element and the first two spring elements.

10. An electrochemical element having a wound electrode set, comprising:
    a strip positive electrode;
    a strip negative electrode;
    a strip separator located between the positive and negative electrodes to form a wound up, spiral electrode winding;
    a cylindrical housing which holds the electrode winding;
    a sealed cell pole isolated from the housing;
    and a connecting element which conductively bridges a distance between an edge of at least one electrode strip and the cell pole, the connecting element comprising a plurality of individually formed spring elements composed of electrically conductive steel strip material connected to the cell pole by a weld;
    wherein the spring elements comprise an attachment section attached to the cell pole and a contact section which is bent away from the attachment section at an acute angle;
    wherein the contact sections are provided with slots in the form of circular arcs.

* * * * *

UNITED STATES PATENT AND TRADEMARK OFFICE
CERTIFICATE OF CORRECTION

| | | |
|---|---|---|
| PATENT NO. | : 7,157,181 B2 | Page 1 of 1 |
| APPLICATION NO. | : 10/308506 | |
| DATED | : January 2, 2007 | |
| INVENTOR(S) | : Rolf Wiepen | |

It is certified that error appears in the above-identified patent and that said Letters Patent is hereby corrected as shown below:

Column 4:
line 7, replace "electro chemical" with --electrochemical--.
line 17, replace "electro chemical" with --electrochemical--.
line 20, replace "electro chemical" with --electrochemical--.

Signed and Sealed this

First Day of May, 2007

JON W. DUDAS
*Director of the United States Patent and Trademark Office*